US012787976B2

(12) United States Patent
Calmet et al.

(10) Patent No.: US 12,787,976 B2
(45) Date of Patent: Nov. 10, 2026

(54) CONTROL SYSTEM OF AN ANTIPARASITE ACCESSORY FOR ANIMALS AND ACCESSORY

(71) Applicant: AB7 SANTE, Deyme (FR)

(72) Inventors: Christophe Calmet, Gibel (FR); David Nguyen, Toulouse (FR); Arnaud Vilbert, Baziege (FR)

(73) Assignee: AB7 SANTE, Deyme (FR)

( * ) Notice: Subject to any disclaimer, the term of this patent is extended or adjusted under 35 U.S.C. 154(b) by 383 days.

(21) Appl. No.: 18/571,093

(22) PCT Filed: Jun. 14, 2022

(86) PCT No.: PCT/FR2022/000057

§ 371 (c)(1),
(2) Date: Dec. 15, 2023

(87) PCT Pub. No.: WO2022/263731

PCT Pub. Date: Dec. 22, 2022

(65) Prior Publication Data

US 2024/0276953 A1 Aug. 22, 2024

(30) Foreign Application Priority Data

Jun. 16, 2021 (FR) ....................................... 2106394

(51) Int. Cl.
*A01K 13/00* (2006.01)
*A01K 29/00* (2006.01)
*A01K 27/00* (2006.01)

(52) U.S. Cl.
CPC .......... *A01K 13/003* (2013.01); *A01K 29/005* (2013.01); *A01K 27/007* (2013.01)

(58) Field of Classification Search
CPC ... A01K 13/003; A01K 27/007; A01K 29/005
See application file for complete search history.

(56) References Cited

U.S. PATENT DOCUMENTS 4,580,529 A * 4/1986 Wilson ................. A01K 13/003 119/62
9,943,387 B2 * 4/2018 Fobi ..................... A01K 11/006
(Continued)

FOREIGN PATENT DOCUMENTS

WO 2020/074796 A1 4/2020

OTHER PUBLICATIONS

International Search Report and Written Opinion dated Dec. 5, 2022, issued in corresponding International Patent Application No. PCT/FR2022/000057, 20 pages.

*Primary Examiner* — Mark A Connolly
(74) *Attorney, Agent, or Firm* — BAKER BOTTS L.L.P.

(57) ABSTRACT

A control system of an accessory for animals is described, wherein the accessory includes: —a refillable device for spraying an active agent, the device including a container for the active agent and a nebulizer body with a controllable spray mechanism; —at least one sensor acquiring measurements relating to the animal wearing the accessory or to the environment thereof; and wherein said control system includes: —a reception unit for receiving data including first data acquired by the at least one sensor; —a determination unit for calculating a risk of infestation of the animal by a parasite according to the data received and determining a control law of the spray mechanism according to the risk of infestation thus calculated, so as to obtain a determined control law; and—a transmission unit for sending the determined control law to the spray mechanism.

10 Claims, 2 Drawing Sheets

(56) References Cited

U.S. PATENT DOCUMENTS

| | | | |
|---|---|---|---|
| 2017/0006826 A1 | 1/2017 | Torres | |
| 2020/0108408 A1 | 4/2020 | Duff | |
| 2021/0029967 A1 * | 2/2021 | Fussell, Jr. | A01K 3/006 |

* cited by examiner

CONTROL SYSTEM OF AN ANTIPARASITE ACCESSORY FOR ANIMALS AND ACCESSORY

CROSS-REFERENCE TO PRIOR APPLICATIONS

This application is a National Stage of PCT/FR2022/000057, filed on Jun. 14, 2022, and designating the United States (published on Dec. 22, 2022, as WO 2022/263731A1), which claims priority under 35 U.S.C. § 119 to French Patent Application No. FR2106394, filed Jun. 16, 2021, hereby expressly incorporated by reference in its entirety and assigned to the assignee hereof.

The present invention relates to a control system of an accessory for animals. It also relates to an accessory comprising such a control system and a method for controlling such an accessory.

BACKGROUND

Like most animals, dogs can be attacked by parasites. The term "parasite" is understood in particular but not exclusively as stinging insects of various kinds, such as fleas, biting flies, horseflies, mosquitoes, sandflies and ticks. Among said biting insects, some are likely to transmit serious diseases to the animal. Such is the case in particular for sandflies and ticks that should be kept away from the animal as much as possible.

Sandflies are biting flies that are morphologically close to mosquitoes. By biting a dog, sandflies can transmit leishmaniasis. This disease is manifested by general fatigue, a lack of appetite and skin problems and cannot be completely healed.

The tick is a parasitic insect from the family of mites. Often present in tall grasses where it is reproduced, this parasite feeds on the blood of the animals on which it is attached. Once the tick is in place on the skin of a dog, it will pump its blood several days, then detach.

Although the tick is painless for the dog, it is nevertheless a major risk. And for good reason, because ticks carry serious diseases. By sucking the blood from the dog and by mixing its saliva, the tick can in particular transmit certain blood diseases to it. In some cases, these diseases can lead to the death of the animal. This is why it is important at any cost to avoid an infestation of the dog by ticks.

There is therefore a need for a control system of an accessory for animals which makes it possible to limit the risk of infestation of an animal by a parasite, in particular biting insects such as fleas, biting flies, horseflies, mosquitoes, and in particular sandflies and ticks.

SUMMARY

To this end, the description describes a control system of an accessory for animals, the accessory comprising:

- a refillable device for spraying an active agent comprising a container for the active agent and a nebulizer body with a controllable spray mechanism,
- a set of at least one sensor, the set of at least one sensor being able to acquire measurements relating to the animal wearing the accessory or to the environment thereof, said control system comprising:

- a reception unit for receiving data, said data received by the reception unit including first data acquired by the set of at least one sensor,

- a determination unit for calculating a risk of infestation of the animal by a parasite according to the data received and determining a control law of the spray mechanism according to the risk of infestation thus calculated, so as to obtain a determined control law, and
- a transmission unit for sending the determined control law to the spray mechanism.

Compared to documents US 2017/0006826 A and WO 2020/074796 A1, which each describe a device for spraying an active agent, such a control system is an autonomous and adaptive system.

Indeed, the control system makes it possible to adjust the operating modes of the spray mechanism, and therefore the dosage, to the risk of infestation of the animal determined using at least one sensor.

The risk of infestation is locally calculated, so that the control system is thus capable of causing the switching of the operating modes of the spray mechanism according to the measured risk.

In other words, the control system is capable of determining how to best limit the risk of infestation of an animal by a parasite in real-time, and of controlling the spraying device to apply the treatment.

Compared to document US 2020/108408 A1 which describes a digitally controlled device for dispersing a chemical agent, the control system is adaptive in the sense that it proposes suitable operating modes in terms of duration and frequency, and not a choice between applying or not applying a chemical agent.

Furthermore, the control system is a system making it possible to obtain a calculated risk of infestation and to adapt the operating modes based on this calculated risk.

According to particular embodiments, the control system has one or more of the following features, considered alone or according to all technically possible combinations:

- the set of at least one sensor comprises a temperature sensor, a humidity sensor and a tracking device of the animal, the determination unit calculating the risk of infestation of the animal according to each of the measurements of the temperature sensor, the humidity sensor and the tracking device of the animal,
- the set of at least one sensor comprises a movement measuring unit comprising at least one of an accelerometer or a gyroscope, the first data comprising a property of a movement of the animal, the property being selected from the amplitude of the movement of the animal, the frequency of the movement of the animal, the distance covered by the animal, the direction of the movement of the animal or the duration of the movement of the animal,
- the determination unit is able to calculate a first risk of infestation for a parasitic species based on a first set of the received data, the determination unit also being able to calculate a second risk of infestation for a parasitic species based on a second set of received data, the first set being distinct from the second set, and the determination unit calculating the risk of infestation of the animal by a parasite based on the values of the first risk of infestation and the second risk of infestation, preferably as the arithmetic mean of the values of the first risk of infestation and the second risk of infestation.
- each risk of infestation is evaluated according to at least three values, preferably according to three values corresponding respectively to a low risk, a medium risk and a high risk.
- the determination unit is able to determine the control law by selecting an operating mode from a plurality of operating modes, each operating mode being a control law coding for a number of activations of the spray mechanism for a predetermined duration and a duration for each activation, the number of activations and the duration of each activation being specific to each operating mode.

the operating modes include main operating modes, for example two main operating modes, and at least one secondary operating mode, a main operating mode being an operating mode for which the predetermined duration is greater than 100 times the duration of an activation and a secondary operating mode being an operating mode for which the predetermined duration is less than 50 times the duration of an activation.

the determination unit is able to determine whether a criterion relating to the risk of infestation is verified and is able to select a secondary mode of operation when said criterion is verified.

the data received by the reception unit comprise second data, the second data being information related to the animal, the controller being able to initialize the control law in a selected main operating mode according to the second data.

the data received by the reception unit comprise a third datum relating to a manual activation of a button, the unit of the control law then selecting a secondary operating mode according to the third datum.

The description also relates to an accessory for animals comprising:

- a refillable device for spraying an active agent comprising a container for the active agent and a nebulizer body with a controllable spray mechanism,
- a set of at least one sensor, the set of at least one sensor being able to acquire measurements relating to the animal wearing the accessory or to the environment thereof, and
- a control system as described above.

The description also describes a method for controlling an accessory for animals comprising:

- a refillable device for spraying an active agent comprising a container for the active agent and a nebulizer body with a controllable spray mechanism,
- a set of at least one sensor, the set of at least one sensor being able to acquire measurements relating to the animal wearing the accessory or to the environment thereof, the control method being implemented by a control system and comprising the steps of:

- receiving data, the received data comprising first data, the first data being data acquired by the set of at least one sensor,
- calculating a risk of infestation of the animal by a parasite based on the data received,
- determining a control law of the spray mechanism based on the determined risk of infestation, in order to obtain a determined control law, and
- sending the determined control law to the spray mechanism.

In the present description, the expression “fit for” means interchangeably “suitable for”, “adapted to” or “configured for”.

BRIEF DESCRIPTION OF THE DRAWINGS

Features and advantages of the invention will become apparent on reading the following description, given solely by way of non-limiting example, and made with reference to the appended drawings, in which.

DETAILED DESCRIPTION

Figure 1:
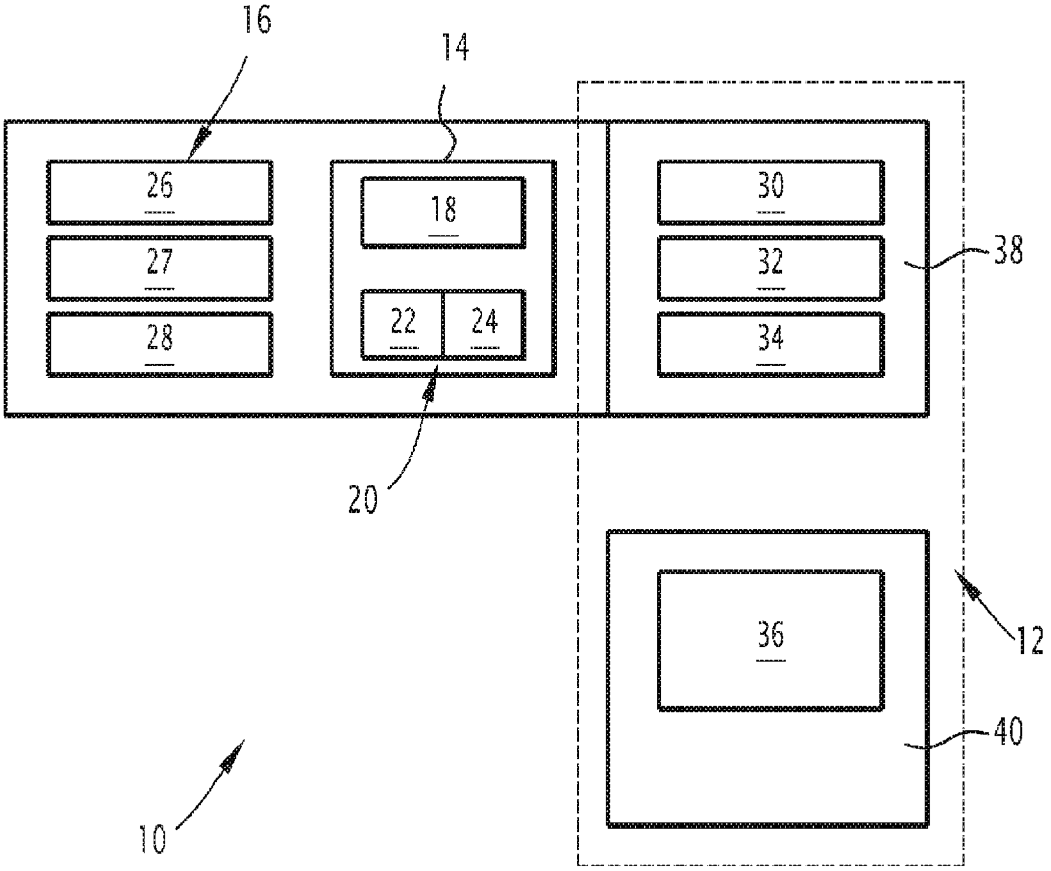
FIG. 1 is a schematic view of an accessory for animals and a control system.

An accessory 10 for animals and a control system 12 are shown in FIG. 1.

An accessory 10 is an element intended to be worn by a part of the body of an animal.

In the example described, the accessory 10 is a collar, that is, an element intended to be worn around the neck of an animal.

Alternatively, a harness, belt or strap can also be considered as an accessory.

The animal is a domestic animal, in particular a cat or a dog.

The accessory 10 comprises a spraying device 14 and a set 16 of sensors.

The spraying device 14 is a device for spraying an active agent.

A spraying device 14 is able to spray a cloud of droplets of an active agent. The sprayed droplets are relatively fine, typically having a size of between 1 micrometer (μm) and 20 μm, preferably between 1 μm and 10 μm.

The spraying device 14 makes it possible to spray the active agent in a localized manner on a specific area of the animal, and in particular the vomeronasal organ (more often called Jacobson organ).

The spraying device 14 can also be used multidirectionally and independently of the movements of the subject. Thus, the spraying device 14 is capable of effectively spraying an active agent regardless of the orientation of the spraying device 14 and the movements imposed thereto.

For this, the spraying device 14 comprises an active agent container 18 and a nebulizer body 20 with a controllable spray mechanism 22.

The active agent container 18 may be a fillable and reusable cartridge or else a cartridge that is disposable after use.

According to the example described, the container 18 is included in a cartridge to be changed.

This makes it possible to obtain a refillable spraying device 14, that is to say a device that can be filled again after use when the container 18 is empty.

Alternatively, the container 18 comprises a filling valve directly incorporated on the surface of the container 18.

The nebulizer body 20 is able to nebulize the liquid active agent into a cloud of droplets.

For this, the nebulizer body 20 comprises multiple elements, including the spray mechanism 22.

The spray mechanism 22 is controllable.

This means that a control law allows activation of the spray mechanism 22. The control law thus makes it possible to remotely control and/or trigger the spraying of the active agent.

According to the example described, when the control law triggers the spraying of an active agent by the spray mechanism 22, the latter delivers an amount of liquid which depends only on the duration of the spraying, the flow rate being fixed by the spray mechanism 22. The volume of sprayed liquid can thus be between 50 μl and 3 ml.

A piezoelectric spray mechanism is an example of a spray mechanism 22 that can thus be controlled.

A piezoelectric spray mechanism is a mechanism comprising a piezoelectric disc in contact with the active agent, said disc vibrating at a frequency enabling the spraying.

Advantageously, the nebulizer body 20 is equipped with an orientation system 24 of the piezoelectric spray mechanism 22 to enable the active agent to be properly sprayed in the desired area.

The active agent is a substance formulated within a liquid composition in order to be able to come into contact with the piezoelectric device, the vibration frequency of which will enable the liquid to be atomized and the substance to be dispersed in the form of a cloud or mist.

The liquid composition containing the active agent is of the aqueous, alcoholic, hydroalcoholic, oily or emulsion form, the nature of which will be adapted to the active agent.

According to a particular embodiment, the composition is exclusively composed of the pure active agent, without solvent.

According to another embodiment, the active agent is diluted within the composition by means of at least one solvent. Examples of usable solvents include, in particular, aromatic or aliphatic hydrocarbons, halogenated hydrocarbons, aromatic or aliphatic alcohols, esters, ethers and ketones, or water. More preferably, the solvents that can be used are triglycerides, such as vegetable or animal oils, or alcoholic solvents, such as ethanol.

Formulation adjuvants can also be added such as, for example, stabilizers, surfactants, synergists, antimicrobial agents.

The active agent represents between 0.01% and 100% of the liquid composition, preferentially between 0.1% and 50% and even more preferentially between 0.5% and 30%.

Here, the active agent is an insecticide or a repellent.

Insecticides and repellents are used in the fight against the aforementioned harmful organisms. For example, the insecticides and repellents are selected, in particular, from the group formed by pyrethroids, pyrethrins and the derivatives thereof, carbamates, formamidines, carboxylic esters, N,N-diethyl-3-methylbenzamide (DEET), Icaridine, phenylpyrazoles, organophosphorus compounds, organohalogen compounds, neonicotinoids, avermectins and the derivatives thereof, spinosyns, essential oils and the constituents thereof (examples: terpenes and the derivatives thereof (alcohols, esters, aldehydes), sesquiterpenes and the derivatives thereof (alcohols, esters, aldehydes)).

As a variant, the active agent is a repellent or an insecticide which is chosen from essential oils such as essential oil of lavender, essential oil of eucalyptus lemon, citronella, lavender, margosa, peppermint, spearmint, pennyroyal, wintergreen or basil or mixtures thereof.

According to one alternative, the repellents are selected from the constituents of essential oils such as geraniol, limonene, menthol, alpha pinene, linalool, citriodiol, citronellal or mixtures thereof.

According to the example described in FIG. 1, the set 16 of sensors comprises three sensors which are a temperature sensor 26, a humidity sensor 27 and a tracking device 28 of the animal.

The temperature sensor 26 is able to measure the temperature of the animal's environment.

The humidity sensor 27 is able to determine the humidity level of the animal's environment.

The tracking device 28 of the animal is able to locate the animal in space.

By way of example, the device 28 for tracking the animal is a global positioning system (more often referred to by the abbreviation GPS).

Alternatively or additionally, the tracking device 28 of the animal can be coupled to any database making it possible to identify and characterize the level of infestation of the zone where the animal is located, such as satellite mapping.

The control system 12 is able to control the accessory 10 and in particular the spray mechanism 22.

The control system 12 is part of the accessory 10. In this sense, the control system 12 is a control system 12 of an accessory.

The control system 12 comprises a reception unit 30, a determination unit 32, a transmission unit 34 and a man-machine interface 36.

The reception unit 30 is able to receive data.

According to the example described, the data received by the reception unit 30 comprise the data from the set 16 of sensors.

The determination unit 32 is able to determine a control law of the spray mechanism 22 according to the data received.

The determination unit 32 thus obtains a determined control law.

The transmission unit 34 is able to send the determined control law to the spray mechanism 22.

The man-machine interface 36 allows a user, in particular the animal's master, to interact with the control system 12.

The man-machine interface 36, for example, is a touch screen enabling the user both to enter information or commands and to provide information to the user. Such a man-machine interface 36 thus combines the functions of an input device and an output device.

As an alternative, separate input and output devices are used.

By way of illustration, the input device is a keyboard. As an alternative, the input device is a pointing peripheral (such as a mouse, a touchpad and a graphic tablet), a voice recognition device, an oculometer or a haptic device.

Similarly, the output device may be a display screen enabling a visual presentation of the output. In other embodiments, the output device is a printer, an augmented and/or virtual display unit, a loudspeaker or another sound generator device to present the output in audible form, a unit producing vibration and/or odors or a unit adapted to produce an electrical signal.

In the case of FIG. 1, the control system 12 is implemented physically in two parts, the first part consolidating the reception unit 30, the determination unit 32 and the transmission unit 34 and the second part corresponding to the man-machine interface 36

Here, the first part is an electronic circuit installed in the accessory 10 while the second part is a terminal 40.

In the embodiment described, the first part is a computer 38.

The computer 38 is an electronic circuit designed to manipulate and/or transform data represented by electronic or physical quantities in the registers of the computer 38 and/or memories for other similar data corresponding to physical data in register memories or other types of display devices, transmission devices or storage devices.

As specific examples, the computer 38 comprises a single-core or multi-core processor (such as a central processing unit (CPU), a graphics processing unit (GPU), a microcontroller and a digital signal processor (DSP), a programmable logic circuit (such as an application-specific integrated circuit (ASIC)), an in situ programmable gate array (FPGA), a programmable logic device (PLD) and programmable logic arrays (PLA), a state machine, a logic gate and discrete hardware components.

The computer 38 is electrically connected to each of the sensors of the set 16 of sensors.

As an alternative, it is conceivable to allow communication with the sensors by bus or an input/output interface.

In the example described, the terminal 40 is a smartphone.

The smartphone is able to implement an application in communication with the computer 38 via a communication network.

An application is a set of program instructions usually downloaded from an external source.

For example, the form of program instructions is a source code form, a computer executable form or any intermediate form between a source code and a computer executable form, such as the form resulting from the conversion of the source code via an interpreter, an assembler, a compiler, a linker or a localizer. Alternatively, the program instructions are a microcode, firmware instructions, state definition data, integrated circuit configuration data (for example, VHDL) or object code.

Other physical implementations are possible as a variant.

For example, the computer 38 can be remote relative to the accessory 10. In such a case, the computer 38 receives the data from the set 16 of sensors either by a wired system or using antennas.

It is also possible to consider that the computer 38 and the man-machine interface 36 are made in the form of a single system such as a remote control.

It could also be envisaged that the computer 38 is part of the computer of the terminal 40. In such a case, by way of example, an application or any other computer program could perform the actions of all the units.

Such an embodiment corresponds to an execution entirely or partially carried out on a single computer, but it is also possible that the execution of the different functions is carried out by a system distributed among several computers (in particular via the use of cloud computing).

The operation of the control system 12 is now described with reference to FIG. 2, which shows a flowchart of an example of operation of a method for controlling the accessory 10.

In the example described, the control system 12 is able to control the spraying device 14 according to several operating modes.

By definition, an operating mode is a control law coding for a number of activations of the spray mechanism 22 during a predetermined duration and a duration for each activation.

The number of activations is the number of times the spray mechanism 22 is triggered during the predetermined duration.

The activation time is the time interval elapsed between the start of activation of the spray mechanism 22 and the end of the activation of the spray mechanism 22.

These various parameters correspond to an administration dosage of the active agent to the animal.

The number of activations and the duration of each activation are specific to each mode of operation.

In other words, each operating mode corresponds to a specific dosage.

The operating modes comprise main operating modes MP1 and MP2 and at least one secondary operating mode MS1 and MS2.

It is recalled here that the example described is in no way limiting, and the number of main operating modes, just like the number of secondary operating modes, can be any number.

A main operating mode MP1 or MP2 is an operating mode for which the predetermined duration is greater than 100 times the duration of an activation.

A main operating mode MP1 or MP2 therefore corresponds to background processing.

For example, the predetermined duration is of the order of a few days while the activation duration is less than 1 minute.

A secondary operating mode MS is an operating mode for which the predetermined duration is less than 50 times the duration of an activation.

In the example described, the predetermined duration is of the order of magnitude of a few hours.

A secondary operating mode MS3 or MS4 thus corresponds to spot treatment.

According to the example described, without this being limiting, the main operating modes MP1 and MP2 are two in number.

The first main operating mode MP1 corresponds to an activation number equal to 1, the predetermined duration is three days and the activation duration is 30 seconds.

The first main operating mode MP1 thus corresponds to a treatment suitable for an animal not having any particular risk of infestation (weak treatment).

The second main operating mode MP2 corresponds to a number of activations equal to 2, the predetermined duration is one day and the activation duration is 30 seconds.

The second main operating mode MP2 thus corresponds to a treatment suitable for an animal having a particular risk of infestation (average treatment).

Several observations can be made regarding these different values for the activation number, predetermined duration and activation duration.

Thus, each main operating mode MP1 or MP2 corresponds to a predefined duration, the activation time difference being greater than or equal to 1, here equal to 1.

Each main operating mode MP1 and MP2 corresponds to the same activation duration.

Of course, what has just been explained is not limiting.

For example, the activation durations of each of the main operating modes MP1 and MP2 could be different.

Typically, the activation duration of the first main operating mode MP1 is between 1 s and 1 minute and the activation duration of the second main operating mode MP2 is between 1 s and 1 minute; the number of activations is equal to 1 or 2 and the predetermined duration is between one day and three days.

Figure 2:
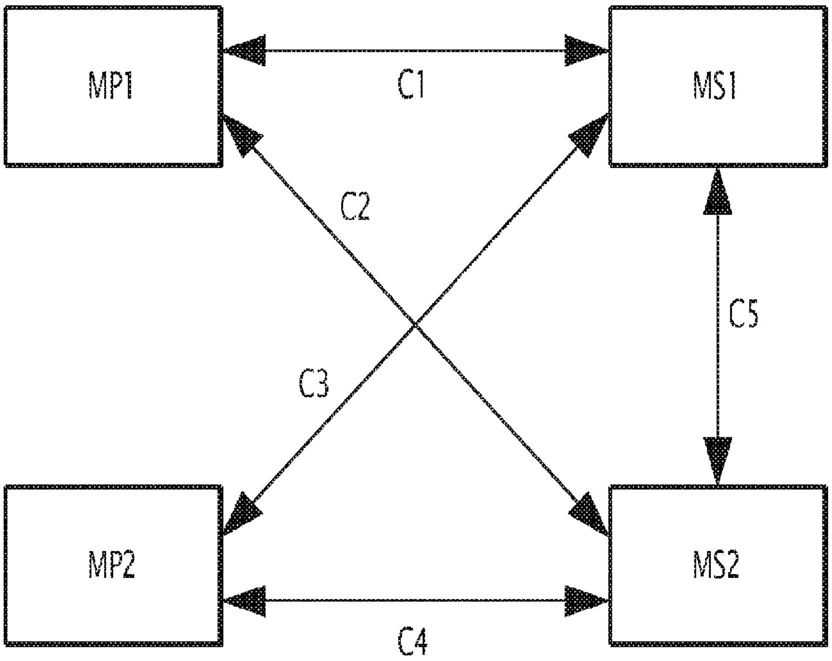
FIG. 2 is a schematic representation of an example of a flowchart of a control method implemented by the control system.

The number of secondary operating modes MS1 and MS2 is equal to 2 in the case of FIG. 2.

According to the example described, the first secondary operating mode MS1 corresponds to an activation number equal to 1, at a predetermined duration of 8 hours and an activation duration of 40 s.

The second secondary operating mode MS2 corresponds to an activation number equal to 1, at a predetermined duration of 6 hours and an activation duration of 40 s.

Of course, what has just been explained is not limiting.

For example, the activation durations of each of the secondary operating modes MS3 and MS4 could be different.

Typically, the activation duration of the first subsidiary operating mode MS3 is between 1 s and 1 minute and the activation duration of the second subsidiary operating mode MS4 is between 1 s and 1 minute; the number of activations is equal to 1 or 2 and the predetermined duration is between 5 hours and 10 hours.

As indicated above, it is the determination unit 32 which determines which mode of operation is appropriate.

For this, the determination unit 32 uses criteria to switch between the various operating modes.

Each of the switching criteria depends on the data received, meaning that these criteria depend on a risk of infestation of the animal by a parasite which is itself dependent on the data received.

Before explaining these different switching criteria, we now describe how the determination unit 32 calculates the risk of infestation by a parasite, and more specifically for fleas, sandflies and ticks.

According to the example described, it is used in combination with data from the set 16 of sensors, pre-stored data and/or data accessible by an internet connection, or from a platform compiling imaging data from satellite, aircraft, drone, local maps of risk and weather data.

The aforementioned data comprise maps and tables.

A map may be a geographical map associating, with a geographical position for example, three levels of infestation risks for a parasite, typically green (weak), orange (medium) and red (high).

There is a map for each type of parasites included by the accessory 10.

Additionally, the memory footprint of the geographic map is reduced by using a limited number of areas, typically 100, the areas grouping together a set of geographic positions, and by allocating to the area a level of infestation risk corresponding to a level of risk of average infestation for all the geographic positions.

To obtain such a map, it is possible to use existing information, to process it (for example, by performing averages and/or interpolations) in order to obtain the data corresponding to the map, in this case the limits of the green, orange and red areas.

Thus, when the tracking device gives the position of the animal, this makes it possible to obtain the area in which the animal is, in the map(s) used, and therefore the associated risk level.

The determination unit 32 thus calculates a first risk of infestation for a parasitic species according to the position data.

The tables are tables associating a paired temperature and a humidity level, three levels of infestation risks for a parasite, typically low, moderate and high.

There is a table for each type of parasite included by the accessory 10.

Additionally, the memory footprint of the table is reduced using intervals for the pairs and allocating to these intervals a level of infestation risk corresponding to a level of average infestation risk for all the values of the intervals.

By way of non-limiting example, the temperatures could be classified into 8 intervals of 5°, the last interval corresponding to temperatures above 35° C. and the moisture levels could be classified into 8 intervals of 10%, the first interval being lower than 40% and the last interval being higher than 90%.

This makes it possible to limit the number of boxes of the table to be stored.

Since the temperature sensor and the humidity sensor provide temperature and humidity, the determination unit 32 determines the three levels (low, moderate, and high) of the infestation risks.

The determination unit 32 also thus calculates a second risk of infestation for a parasitic species as a function of temperature and humidity.

The first risk of infestation and the second risk of infestation come from two sets of the distinct received data.

From the first and second risks of infestation, the determination unit 32 calculates the risk of general infestation of the animal by a parasite by applying a function of the values of the first risk of infestation and the second risk of infestation.

By way of example, the determination unit 32 may use the arithmetic mean of the values of the first risk of infestation and the second risk of infestation.

However, other computing formulas can be envisaged, in particular a weighted average favoring temperature and humidity data.

Such an operation can be described in the following table:

TABLE 1

| First Risk of Infestation | Second Risk of Infestation | Risk of Infestation |
|---|---|---|
| Green Zone | Low | 1 |
| Green Zone | Moderate | 1 |
| Green Zone | High | 2 |
| Orange Zone | Low | 1 |
| Orange Zone | Moderate | 2 |
| Orange Zone | High | 3 |
| Red Zone | Low | 2 |
| Red Zone | Moderate | 3 |
| Red Zone | High | 3 |

In the example described, for the case of sandflies and ticks, the technique just described is implemented.

For fleas, since the use of a map is not very suitable, the risk of infestation is directly the risk of infestation obtained by the table relating to temperature and humidity.

It was thus described as determining the risk of infestation of an animal for each parasite.

As indicated above, it is the determination unit 32 which then determines which mode of operation is appropriate from this calculated risk of infestation.

For this, the determination unit 32 can be seen as a set of two subunits, a first subunit determining a number of activations of the spray mechanism for a predetermined duration and a second subunit determining a duration for each activation.

Each of these two subunits uses the values given by the set 16 to determine the value of the quantity that the sub-unit concerned calculates.

According to the example described, more specifically, it is based on the risks of infestation of an animal for each parasite that it is possible to evaluate the criteria that will now be described.

The determination unit 32 uses the first criterion C1 to determine whether a transition between the first main operating mode MP1 and the first secondary operating mode MS1 is indicated.

By transition, in the context of this example, a switchover is understood in one direction (here from the first main operating mode MP1 and the first secondary operating mode MS1) or in another direction (here from the first secondary operating mode MS1 and the first main operating mode MP1).

In the case described, the first criterion C1 is met when the maximum of each risk of infestation of an animal for each parasite is equal to a risk of 2.

The determination unit 32 uses the second criterion C2 to determine whether a transition between the first main operating mode MP1 and the second secondary operating mode MS2 is indicated.

In the case described, the second criterion C2 is met when the maximum of each risk of infestation of an animal for each parasite is equal to a risk of 3.

The determination unit 32 uses the third criterion C3 to determine whether a transition between the second main operating mode MP2 and the first secondary operating mode MS1 is indicated.

In the case described, the third criterion C3 is similar to the first criterion C1, that is to say that the third criterion C3 is met when the maximum of each risk of infestation of an animal for each parasite is equal to a risk of 2.

The determination unit 32 uses the fourth criterion C4 to determine whether a transition between the second main operating mode MP2 and the second secondary operating mode MS2 is indicated.

In the case described, the fourth criterion C4 is similar to the second criterion C2, that is to say that the fourth criterion C4 is met when the maximum of each risk of infestation of an animal for each parasite is equal to a risk of 3.

The determination unit 32 uses the fifth criterion C5 to determine whether a transition between the first secondary operating mode MS1 and the second secondary operating mode MS2 is indicated.

In the case described, the fifth criterion C5 is similar to the criteria C2 and C4, that is to say that the fifth criterion C5 is met when the maximum of each risk of infestation of an animal for each parasite is equal to a risk of 3.

It may also be noted that it is prohibited to switch from the first main operating mode MP1 to the second main operating mode MP2 and vice versa.

On initialization, the control device initializes the control law in a main operating mode MP1 or MP2 selected based on second data.

The second data is information relating to the animal.

For example, a questionnaire is provided to a user who fills it out on the terminal 40. The main operating mode MP1 or MP2 is chosen according to the responses to these questions, typically by the calculation of a score dependent on these responses.

The questions will be able to concern the presence of symptoms, life habits or the existence of potentially relevant recent events.

For example, it may be asked if the animal lives in an urban or rural environment, if the animal lives alone or in the presence of other animals, if the animal has access to a garden, if the animal is currently under treatment, if the animal is treated regularly or if the animal was infested in the preceding month.

It could also be envisaged to ask the breed of the animal or its age to better determine the appropriate main operating mode for the animal. Indeed, the risk of infestation may be related to the breed and/or the size of the animal more or less subject to being in contact with the parasite.

Such a control system 12 makes it possible to generate a control law suitable for avoiding infestation.

In fact, the control system 12 makes it possible to better determine the risk since the risk is continuously obtained as soon as the animal wears the accessory 10.

Furthermore, the control system 12 is capable of determining how to treat the animal best in real time and to control the spraying device 14 in order to apply the treatment.

Other embodiments benefiting from the same advantages are conceivable.

In particular, the set 16 of sensors may differ.

As an example, the set 16 of sensors may also comprise a unit for measuring movement.

A movement measuring unit is a unit capable of acquiring at least one property of the animal's movement.

By way of illustration, the movement measuring unit here comprises an accelerometer and a gyroscope but could comprise only one of the two.

The movement measuring unit is able to acquire a property chosen from the amplitude of the movement of the animal, the frequency of the movement of the animal, the distance covered by the animal, the direction of movement of the animal or the duration of movement of the animal.

The movement measuring unit can thus make it possible to detect excessive licking or suspicious scratching. This implies that the movement unit 26 makes it possible to obtain a property of said movement to analyze the behavior of the animal.

Furthermore, other sensors can be used as a variant or in addition.

For example, a heart rate monitor, a blood pressure monitor or a body temperature sensor may be envisaged.

According to another example, the data received by the reception unit 30 comprises third data relating to manual activation of a button, the unit of the control law then selecting a secondary operating mode MS according to the third data.

The button can be an area of a touch screen or a physical button.

This allows the user to adapt the treatment if he deems it appropriate.

Alternatively or additionally, the determination unit 32 can operate according to a control law different from that which has just been described. In particular, it is possible to envisage any combination of main MPi and secondary MSj operating modes associated with one another by additional Ck criteria where i, j and k are integers greater than or equal to 1 which a priori have no reason to be identical.

Moreover, an example was presented in which the risk of infestation is evaluated according to three values, corresponding respectively to a low risk, a medium risk and a high risk.

The risk of infestation can be evaluated according to a different number of values, and in particular a number greater than or equal to three values.

According to a particular embodiment, the determination unit 32 is able to learn the control law.

The determination unit 32 may in particular be the characteristics of the main MPi and secondary MSj operating modes, their number as well as the criteria Ck For this, the determination unit 32 implements a machine or artificial learning technique, more often referred to as "machine learning."

By way of example, a neural network, a random forest technique, a support vector machine technique or Bayesian techniques may be envisaged.

The determination unit 32 could, for example, perform a temporal analysis of the behavior of the dog and/or identify common points between the switchovers to a secondary operating mode MS.

For example, certain times of the day may be times at risk for which a switchover to a secondary operating mode MS is indicated.

Typically, a weekend walk in the woods is an event occurring in a generally known time interval and for which, as a preventive, it may be indicated to switch to a secondary operating mode MS1 or MS2.

Such machine learning technique could also be used to improve the estimation of the risk, in particular based on the field reality provided by the master.

To improve the estimation of the risk, it is also conceivable to use other data as well.

By way of example, mention may be made of parasites distribution data in the territory, geological data (history over several years), changes of streams, vegetation data and changes thereto, and weather data.

Such data may in particular come from satellite data giving the aforementioned information or from which a processing module can extract this information.

In each of the embodiments, the control system 12 makes it possible to limit the risk of infestation of an animal by a parasite, in particular biting insects such as fleas, biting flies, horseflies, mosquitoes, and in particular sandflies and ticks.

A control system 12 that makes it possible to make the accessory 10 intelligent because the use of the control system 12, the set 16 of at least one sensor and the spraying device 14 makes the accessory 10 capable of implementing a method for treating an animal at least preventively in an environment where there are parasites.

The present invention therefore relates to a control system 12 for an accessory 10 for animals, the accessory 10 comprising:

- a refillable device 14 for spraying an active agent comprising an active agent container 18 and a nebulizer body 20 with a controllable spray mechanism 22,
- a set 16 of at least one sensor, the set 16 of at least one sensor being able to acquire measurements relating to the animal wearing the accessory 10 or to the environment thereof, said control system 12 comprising a computer 38 consolidating:

- a reception unit 30 able to receive data, said data received by the reception unit 30 comprising first data acquired by the set 16 of at least one sensor,
- a determination unit 32 for:
- calculating a risk of infestation of the animal by a parasite based on the received data, the calculated risk of infestation being evaluated according to at least three distinct values, and
- determining a control law of the spray mechanism 22 based on the calculated risk of infestation, in order to obtain a determined control law, the determination unit 32 determining the control law by selecting an operating mode from a plurality of operating modes, each operating mode being a control law coding for a number of activations of the spray mechanism for a predetermined duration and a duration for each activation, the number of activations and the duration of each activation being specific to each operating mode, and
- a transmission unit 34 able to send the determined control law to the spray mechanism 22.

The present invention also relates to an accessory 10 for animals comprising:

- a refillable device 14 for spraying an active agent comprising an active agent container 18 and a nebulizer body (20) with a controllable spray mechanism 22,
- a set 16 of at least one sensor, the set 16 of at least one sensor being able to acquire measurements relating to the animal wearing the accessory 10 or to the environment thereof, and
- a control system 12 as defined above.

Finally, the invention relates to a method for controlling an accessory 10 for animals comprising:

- a refillable device 14 for spraying an active agent comprising an active agent container 18 and a nebulizer body 20 with a controllable spray mechanism 22,
- a set 16 of at least one sensor, the set 16 of at least one sensor being able to acquire measurements relating to the animal wearing the accessory 10, or to the environment thereof, the control method being implemented by a control system 12 as described above and comprising the steps of:

- receiving data, the received data comprising first data, the first data being data acquired by the set 16 of at least one sensor,
- calculating a risk of infestation of the animal by a parasite based on the received data, the calculated risk of infestation being evaluated according to at least three distinct values,
- determining a control law of the spray mechanism 22 based on the determined risk of infestation, in order to obtain a determined control law, the determination of the control law being implemented by selecting an operating mode from a plurality of operating modes, each operating mode being a control law coding for a number of activations of the spray mechanism for a predetermined duration and a duration for each activation, the number of activations and the duration of each activation being specific to each operating mode, and
- sending the determined control law to the spray mechanism 22.

The invention claimed is:

1. An animal accessory comprising:

- a refillable device for spraying an active agent, the device comprising a container for the active agent and a nebulizer body with a controllable spray mechanism,
- a set of at least one sensor configured to acquire measurements relating to an animal wearing the accessory or to an environment thereof,
- a control system comprising a computer configured to:
- receive data, said data received including first data acquired by the set of at least one sensor,
- calculate a risk of infestation of the animal by a parasite according to the data received, the calculated risk of infestation being one of at least three distinct values,
- determine a control law of the spray mechanism according to the calculated risk of infestation by selecting an operating mode from a plurality of operating modes, each operating mode being a control law coding for a number of activations of the spray mechanism for a predetermined duration and a duration of each activation, the number of activations and the duration of each activation being specific to each operating mode, and
- send the determined control law to the spray mechanism.

2. The animal accessory according to claim 1, wherein the set of at least one sensor comprises a temperature sensor, a humidity sensor and a tracking device of the animal, and wherein the computer is further configured to calculate the risk of infestation of the animal according to each of the measurements of the temperature sensor, the humidity sensor and the tracking device of the animal.

3. The animal accessory according to claim 1, wherein the set of at least one sensor comprises a movement measuring unit comprising at least one of an accelerometer and a gyroscope, the first data comprising a property of a movement of the animal, wherein the property is selected from the group consisting of the amplitude of the movement of the animal, the frequency of the movement of the animal, the distance covered by the animal, the direction of the movement of the animal, and the duration of the movement of the animal.

4. The animal accessory according to claim 1, wherein the computer is further configured to calculate a first risk of infestation for a parasitic species based on a first set of the received data, calculate a second risk of infestation for a parasitic species based on a second set of the received data, the first set being distinct from the second set, and calculate the risk of infestation of the animal by a parasite based on the values of the first risk of infestation and the second risk of infestation.

5. The animal accessory according to claim 4, wherein the computer is further configured to evaluate each risk of infestation according to the combination of the data from the set of sensors.

6. The animal accessory according to claim 4, wherein the computer is further configured to calculate the first risk of infestation of the animal by a parasite based on an arithmetic mean of the values of the first risk of infestation and the second risk of infestation.

7. The animal accessory according to claim 1, wherein the operating modes include main operating modes and at least one secondary operating mode, a main operating mode being an operating mode for which the predetermined duration is greater than 100 times the duration of an activation and a secondary operating mode being an operating mode for which the predetermined duration is less than 50 times the duration of an activation.

8. The animal accessory according to claim 7, wherein the computer is further configured to determine whether a criterion relating to the risk of infestation is verified and select a secondary mode of operation when said criterion is verified.

9. The animal accessory according to claim 1, wherein the data received comprise second data, the second data being information related to the animal, and wherein the computer is further configured to initialize the control law in a selected main operating mode according to the second data.

10. The animal accessory according to claim 9, wherein the data received comprise a third datum relating to a manual activation of a button, and wherein the computer is further configured to select a secondary operating mode as a function of the third datum.

* * * * *